Figure 1:
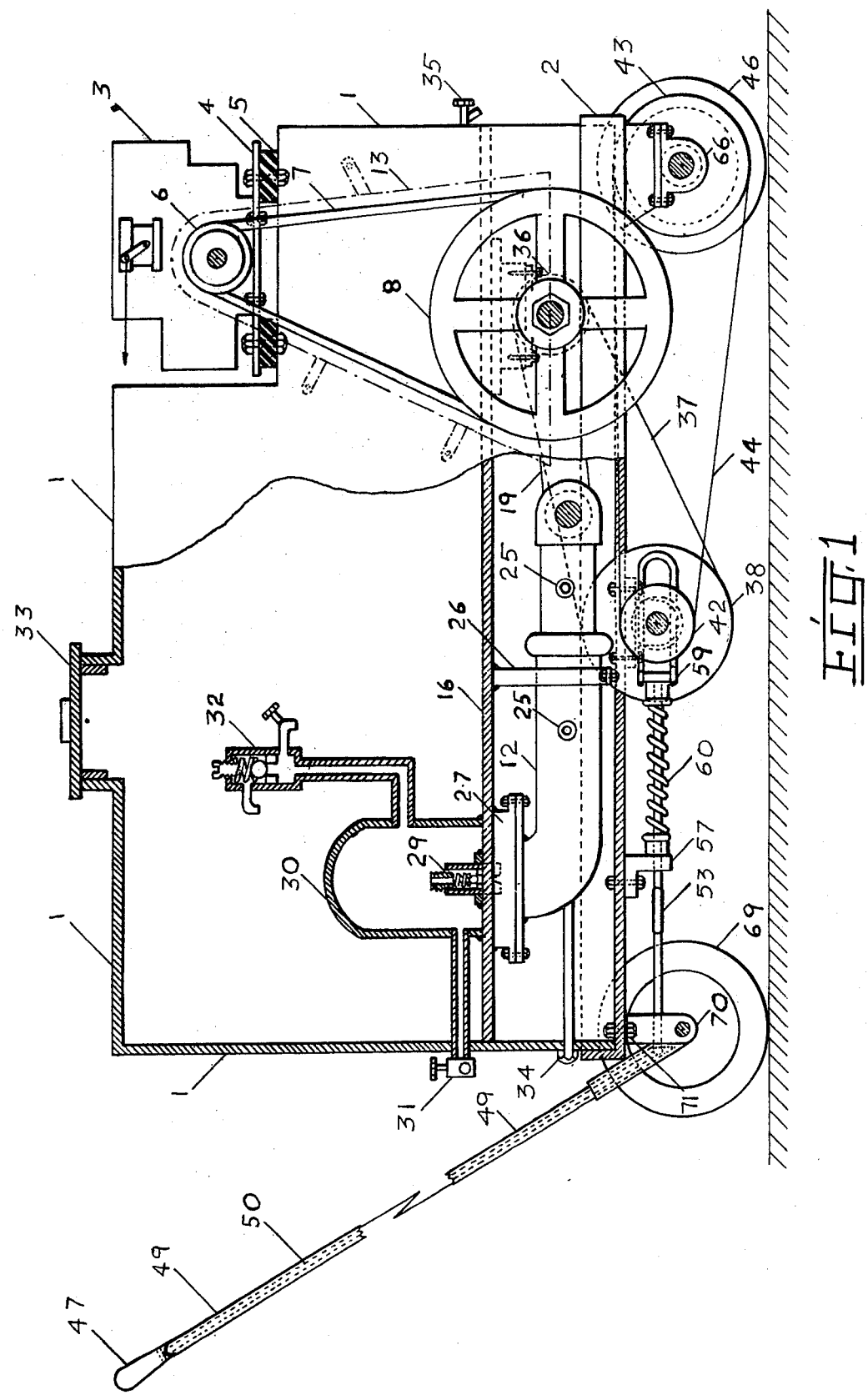

United States Patent [19]

Backo

[11] 4,333,609

[45] Jun. 8, 1982

[54] POWER PROPELLED RECIPROCATING PISTON PUMP LIQUID SPRAYER

[76] Inventor: Stevan Backo, 1884 Pillette Rd., Windsor, Ontario, Canada, N8T 1P1

[21] Appl. No.: 139,191

[22] Filed: Apr. 11, 1980

[51] Int. Cl.³ .............................................. B05B 9/03
[52] U.S. Cl. ................................ 239/124; 180/53 R; 239/142; 239/146; 239/286
[58] Field of Search .............. 239/124, 142, 146, 286, 239/332; 180/53 R, 53 D, 19 H, 19 S, 19 R

[56] References Cited

U.S. PATENT DOCUMENTS

| | | | |
|---|---|---|---|
| 2,111,439 | 3/1938 | Squyars | 239/142 X |
| 2,627,438 | 2/1953 | McNair | 239/142 |

*Primary Examiner*—Andres Kashnikow

[57] ABSTRACT

In a Power Propelled Reciprocating Piston Pump Liquid Sprayer, there is a reservoir which is mounted on a frame to whose cross members wheels are attached by which the reservoir with its contents is propelled forward. The power unit mounted on the reservoir can be either electric or the gas powered engine type, it drives both the sprayer and the reciprocating piston pump mounted at the base of the reservoir. The pump employs a spring tensioned rubber piston with manual adjusting mechanism and is reciprocated by a power driven crank. On the induction stroke liquid in the reservoir is drawn through the sliding disc valve into the cylinder, on compression, contents is forced through a spring ball loaded valve into a separate chamber situated within the reservoir. From the chamber runs a tube to the exterior of the reservoir where a flexible hose is attached with a spray nozzle on the end. Spring loaded release valve with the pressure adjustment and faucet are situated on the chamber which enable any surplus fluid to be released back into the reservoir. The power to the rear wheels is transmitted via a "V" belt to a pulley attached to the crankshaft to which a sprocket is attached and from which power is further transmitted via a link chain, clutch and shaft arrangement, propelling the sprayer in the forward direction and reducing its speed to approximately walking pace.

12 Claims, 5 Drawing Figures

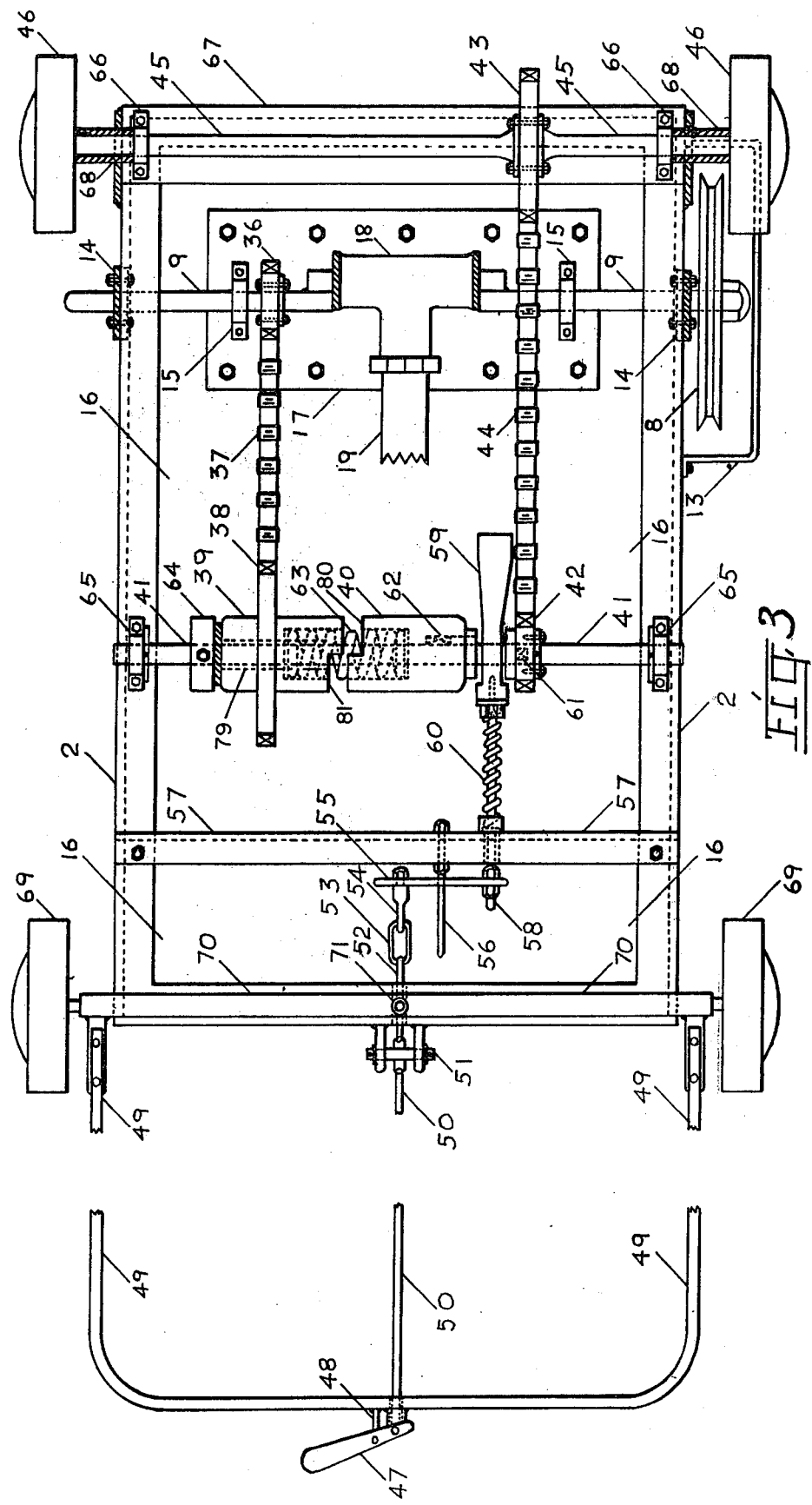

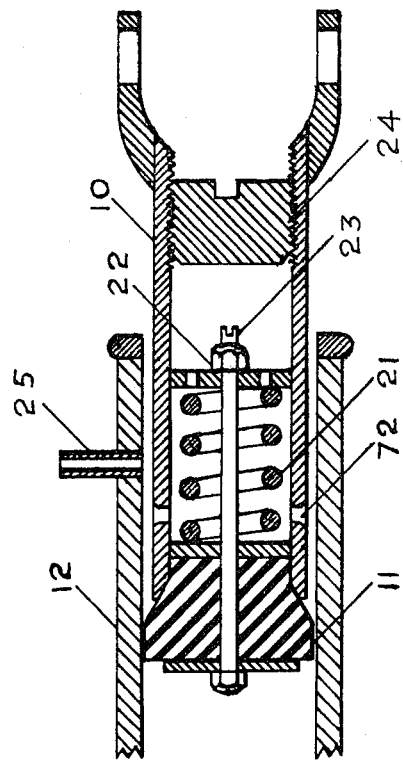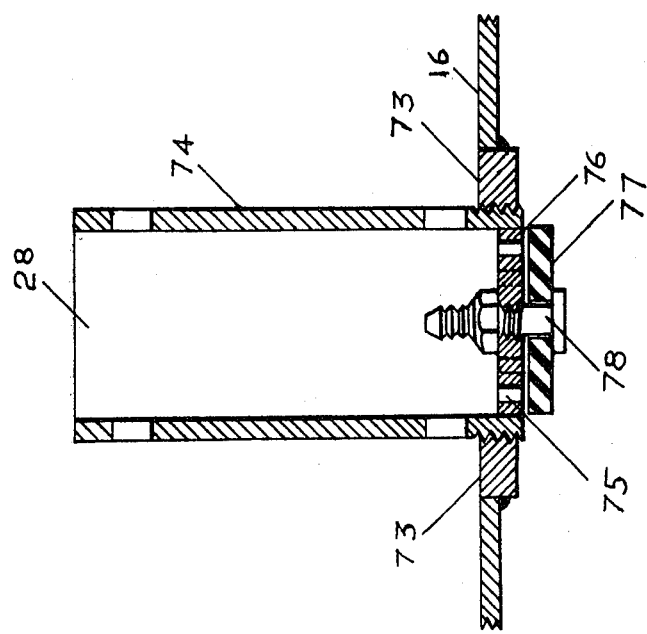

POWER PROPELLED RECIPROCATING PISTON PUMP LIQUID SPRAYER

It is common in Liquid Sprayers to employ an air compressor or an air pump which is operated either manually or by mechanical power source. The air under pressure is passed into the reservoir containing the fluid to be sprayed thus pressurizing the contents. On release of the pressure from the reservoir to the atmosphere through a spray nozzle the liquid contents is forced out by the pressure thus creating a fine stream of spray. Although this type of sprayer can produce desired results in the quality of spray which partially is controlled by the quality and type of nozzle used, it is neverthanless a very cumbersome device, difficult and expensive to manufacture and repair and can sometimes be time consuming while one waits for the pressure to build up in the reservoir. These devices are generally towed on a trailer by the tractor through the fields and orchards and are not generally suitable for smaller farms and city size lot use. The manually operated ones generally carried by hand and pressure build up is done by manually operating an air pump handle, although inexpensive to produce, its operation is very time consuming and pressure build up is very low, resulting in poor quality of spray and its uses are limited.

I have found that these disadvantages may be overcome by employing a reciprocating piston pump which is mounted under the fluid reservoir and powered by either an electric motor or an internal combustion engine. The pump employs an inlet or suction valve through which the fluid is drawn into the cylinder on the outward stroke and is forced into a separate chamber through a spring loaded ball valve on the inward stroke, as a chamber is filled up "which is a matter of seconds" fresh supply of liquid from the pump forcing the fluid from the chamber out through the spray nozzle on release. The pressure chamber has a spring loaded release valve, which acts both as a safety valve and pressure regulating valve, this valve releases any surplus fluid which can not pass through the nozzle due to restriction resulting from the size of the nozzle back into the reservoir. Besides acting as a safety and pressure regulating valve this enables the fluid in the reservoir to be constantly mixed ensuring any particles to remain suspended in the fluid. On the same tube leading from the said chamber on which a said release valve is mounted and prior to the valve, a faucet is situated which when opened releases all the pressure in the system and dumps all of the fluid pumped into the chamber back into the reservoir constantly mixing the contents in the reservoir. This is generaly used when starting up the power unit, prior to commencement of spraying or while transporting the sprayer from oe place to another under its own power when no spraying is taking place. This sprayer is self propelling and all an operator needs to do is depress a handle to engage a clutch and power is transmitted from the power unit via a "V" belt to the crank pulley via a front link type chain to the clutch shaft and the rear chain to the rear axle shafts and to the rear wheels. The speed of the sprayer is geared down to approximately walking pace. To manufacture this machine would be very inexpensive since there is no air compressor, air seals, hoses and fittings associated with the air compressor. It can be transported under its own power from tree to tree, across the lawn etc. Its contents is constantly mixed which means that powder particles would not settle to the bottom but would remain suspended in the liquid i.e. water. It is lightweight and easy and safe to operate, it can be used indoors with electric motor preventing gas fumes, such as watering or spraying of greenhouse plants. It can be used for industrial purposes, for washing cars, store shelves, machine components etc. where there is no piped water at hand or where a liquid mixture is required. Pressure of spray can be regulated to prevent damage to the fragile plants when they are being sprayed. Front wheels can be steered and all parts of the sprayer can be easily lubricated and maintained.

In drawings which illustrate embodiments of the invention,

FIG. 1 is an elevation partly in section showing the reservoir, the pressure chamber and valve arrangement, position of the pump, drive train, the clutch, steering mechanism and the power unit.

FIG. 2 is a view showing a reciprocating piston pump and crankshaft, piston with the spring tension and adjusting mechanism, valve housing and valve arrangement.

FIG. 3 shows power transmission and gearing, clutch, clutch engagement fork and its linkage, front and rear axles and wheels, steering handle and clutch operating handle.

FIG. 4 shows a cross section of an inlet valve detailing the valve body with suction ports at it's base, a rubber disc and the centrally located pin.

FIG. 5 shows a cross section of the piston within the cylinder, tensioner spring and the lubrication ports.

The sprayer illustrated comprises a reservoir 1, which is mounted onto the frame 2. On top and to the rear of the reservoir 1, provision is made for the power unit 3, which is bolted to the base plate 4 and rubber insulators 5.

When the power unit is operative, power is transmitted from the 2 inch engine pulley 6, via a "V" belt 7, to a 12 inch pump crank pulley 8 (achieving 6:1 speed reduction) which rotates the crankshaft 9, thus reciprocating the piston sleeve 10, and the rubber piston 11 within a cylinder 12.

As a safety feature there is a protective cover 13, over the engine pulley 6, "V" belt 7 and the upper portion of the crank pulley 8. Crankshaft is supported in the sleeve type bushings 14 and 15 bolted to the reservoir base 16 and the reinforcement plate 17.

As the crankshaft rotates, circular motion is changed into reciprocating motion by the crank pin, connecting rod end 18, connecting rod 19 and the movable joint pivoted about the pin 20.

Piston comprises of a sleeve with an internally fixed boss 10, FIGS. 2 and 5 at the end of a said sleeve is a rubber piston 11, tensioned by a spring 21, thus providing a seal preventing the liquid from flowing passed and out of the cylinder 12. When rubber piston 11 wears, nut 22 can be manually tightened while the retaining rod 23 is being held with e.g. screwdriver. Plug 24 is provided to prevent the dirt from entering into the piston sleeve 10, while retaining pre-packed grease within. Small ports 72 FIG. 5 are drilled in the wall of the piston sleeve 10, which enable grease to escape gradually thus lubricating internal surface of cylinder 12. Additional lubrication is achived by manually inserting few drops of oil through the tube 25. Crank pin 18 and joint pivot pin 20 are lubricated in the similar manner e.g. plug or nipple 25 on the hollow connecting rod 19.

Cylinder 12 in which the piston 11 reciprocates is supported by a brace 26 FIG. 2 welded to the reservoir base 16. At the other end cylinder 12 is welded to the lower part of the valve housing 27 which bolts up to the upper portion which in turn is welded to the reservoir base 16. Welds and seals around these components must be of such nature so as not to allow the liquid under pressure to leak.

Figure 2:
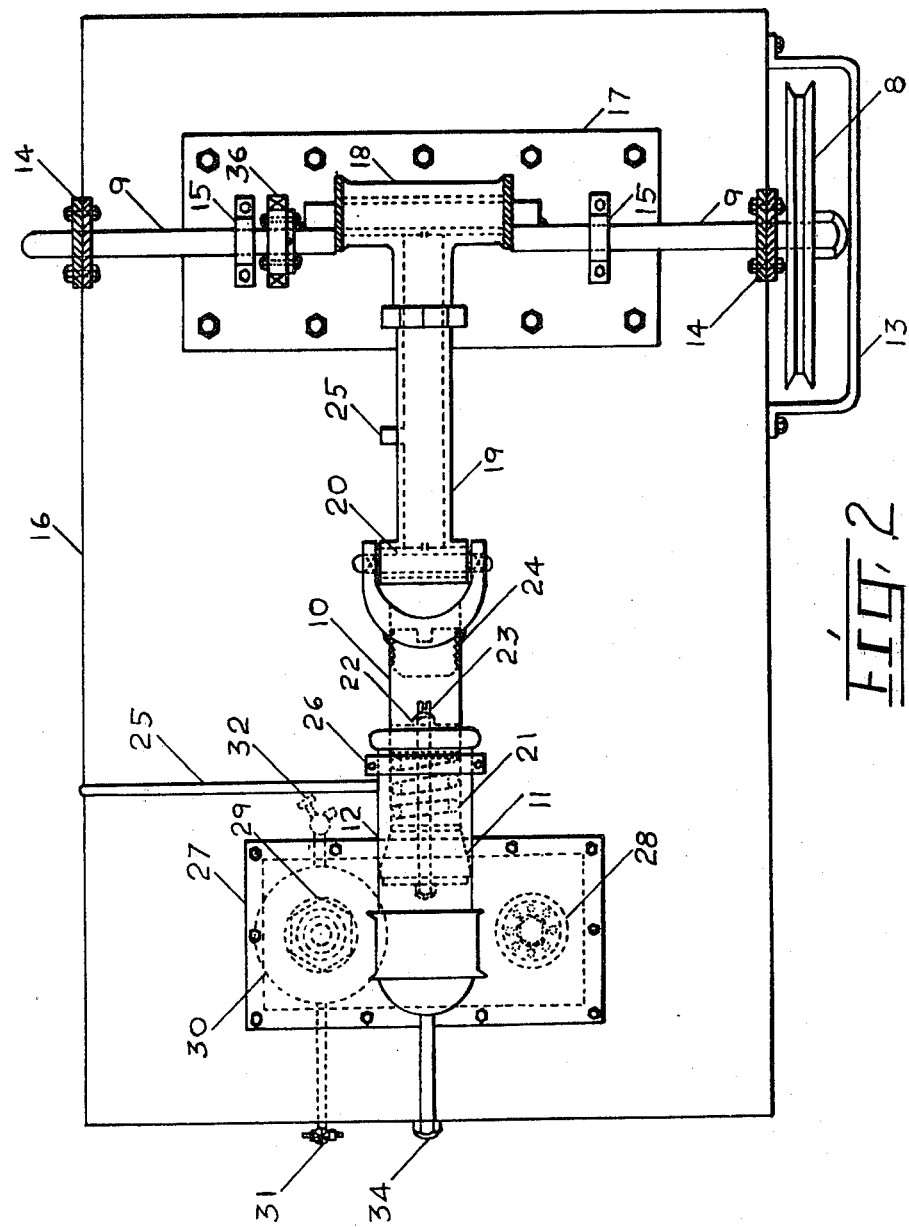

Housed partially within the valve housing 27 are the suction or inlet valve 28, FIGS. 2 and 4, and the exhaust or the outlet valve 29 FIGS. 1 and 2.

Inlet valve 28 FIGS. 2 and 4 comprises of a threaded boss 73 which is welded around a hole in the reservoir base 16. An inlet valve body 74 which threads into the welded boss 73 from inside the reservoir 1 (to enable easy access for service) and protrudes into the valve housing 27, has several small ports 75 drilled in its base 76 through which liquid is passed from the reservoir 1 into the cylinder 12 on the outward (induction) stroke. These small approximately $\frac{1}{8}$" dia. ports 75 are blocked off on the third (exhaust stroke) by a rubber disc 77 which slides on a pin 78 passing through its center and which is fixed to the center of the said inlet valve body base 76.

Outlet valve 29, which is also partially contained within the valve housing 27 and is placed parallel in line with the inlet valve 28, also has a boss welded around a drilling in the reservoir base 16 into which an outlet valve body is threaded. This valve is of a ball and spring type, which when the piston 11 FIG. 2 moves foreward inside the cylinder 12 forcing the liquid contents foreward, pressure of which overcomes the outlet valve 29 spring pressure thus lifting the ball off its seat causing the fluid to flow into the chamber 30. When the piston 11 begins to move outwards pressure in the cylinder 12 is reduced and the valve spring seats the steel ball trapping the liquid inside the chamber 30, this chamber 30 is filled up with several strokes of the piston.

Liquid chamber 30 is made of heavy gauge steel and is welded to the reservoir base 16, it completely encloses the upper portion of the outlet valve 29. From the chamber 30 runs a tube 31 to the exterior of the reservoir 1. To this tube 31, a flexible hose with the spray nozzle is attached (not shown.)

When the chamber 30 is filled up with the liquid and the faucet is turned on allowing the free passage to the spray nozzle, spraying commences. To prevent excessive buildup of pressure and consequent failure of the machine, a safety pressure adjusting and release valve 32 is built onto the chamber. This valve is of the ball and spring type with the provision for the spring tension to be manually adjusted by tightening or loosening the adjusting screw resulting in liquid pressure variations. Prior to the ball check valve a faucet is provided which when opened allows the fluid to run freely back into the reservoir minimizing pressure in the system. Access to this valve is obtained through the filler cap 33.

Certain drain points are provided on this machine to drain the pump 12 for storage or when the type of liquid to be sprayed is being changed, tube and plug 34 are provided. Reservoir 1 is drained through cock 35, while the chamber 30 can be drained through the passage 31.

Besides being able to spray liquids into the atmosphere this machine is designed so that it is propelled under its own power in the following manner.

The power generated by the power unit 3 is transmitted from a 2" dia. power unit pulley 6 to a 12" dia. pump and transmission shaft pulley 8 via a "V" belt 7, resulting in a speed reduction ratio of 6:1.

To the crankshaft 9 a chain drive sprocket 36, (having 15 teeth) is attached from which power is trasmitted via a lik chain 37 to a larger sprocket 38 (having 49 teeth) which is attached e.g. by welding to a free wheeling clutch member 39 which rotates on a bronze bushing 79 FIG. 3, (this produces further reduction in speed in the ratio of 3.26:1) when the sliding clutch member 40 having a cut away section 80 is engaged with the free wheeling clutch member 39 having a cut away section 81, the power is transmitted along a clutch shaft 41 to which sprocket 42 (having 15 teeth) is secured. From clutch shaft sprocket 42 to rear axle shaft sprocket 43 (having 37 teeth) power is transmitted via a link chain 44 (this adds final speed reduction of 2.46:1). Power is then transmitted via the axle shafts 45 to the rear wheels 46 (with the overall speed reduction of 11.72:1).

To engage the clutch, a clutch lever 47 which is pivoted on fulcrum 48 fixed to the steering handle 49 must be pressed manually causing the clutch control rod 50 to be drawn foreward which causes the pivot 51 to move about its axis. This causes the whole linkage, rod 52 link 53, rod 54 crosshaft 55 which slides on the guide pin 56 (which is bolted to the cross member 57) rod 58 and consequently clutch engagement fork 59 to move foreward against the pressure of the spring 60 FIG. 3.

When the clutch fork 59 is moved foreward its tapered surface presses against the sprocket 42 and the sliding clutch member 40. Being that the sprocket 42 is fixed to the clutch shaft 41 with a pin and a woodruff key 61, to facilitate assembly, it can not be moved outwards by the pressure exerted by the the clutch fork 59 all of the movement results in the sliding clutch member 40, which moves on the shaft 41 and the woodruff key 62, overcoming the pressure of the spring 63 and engaging with the freewheeling clutch member 39 thus locking it into the power train.

When the clutch lever 47 is released the compressed clutch fork disengagement spring 60 causes the clutch linkage and the clutch fork 59 to move back into its original position. With the pressure released on the sliding clutch member 40, spring 63, forces the two clutch members 40 and 39 apart preventing the power flow passed the freewheeling clutch member 39.

Freewheeling clutch member 39 is prevented from sliding back and forth on the clutch shaft 41 by the pressure of the spring 63 acting on one side and the retainer 64 on the other side. Clutch shaft 41 is supported and runs in the bushing lined supports 65. Retainers with the clevis pins prevent clutch shaft 41 from sliding within the supports 65.

Rear axle shafts 45 are supported in a bushing lined supports 66 which are bolted to the rear cross member 67 which is attached to the frame 2 by a strut on either side. Spaces 68 prevent the axle shafts 45 and rear wheels 46 from moving sideways in the support bushings 66.

Wheels 46 and 69 have a steel disc and rim with a solid rubber tire, centre hub comprises of a caged needle roller bearings, they are retained on the axles 45 rear and 70 front by a thrust washer and a split pin (not shown).

Front axle 70 is pivoted to the frame 2 by a pivot pin 71. Steering handle 49 is bolted to the axle 70 on both ends close to the wheels 69. Any movement of the handle 49 by the operator in either direction will cause the axle 70 with the attached front wheels 69 to move in the same direction about the pivot 71 thus steering the whole machine in that direction.

The embodiments of the invention in which an exclusive property or privilege is claimed are defined as follows:

1. A power propelled reciprocating piston pump liquid sprayer comprising: a frame having front and rear cross members; a front axle being pivotally supported from the center of said front cross member and a rear axle supported from said rear cross member; a pair of wheels journalled on the opposite ends of the front axle and a pair of wheels journalled on the opposite ends of the rear axle; a steering handle connected to the front axle for moving the sprayer in the desired direction; a reservoir for holding the liquid to be sprayed mounted upon said frame; a power unit mounted on top and to the rear of said reservoir; a first pulley connected to said power unit; a reciprocating piston pump mounted at the base of said frame; a crankshaft connected to said reciprocating piston pump; a second pulley connected to said crankshaft; a "V" belt trained over said first and second pulleys in order to operate said reciprocating piston pump; a valve housing secured to the base of said reservoir; inlet means to the reciprocating piston pump being located partly in said valve housing and partly in said reservoir, valve means in the form of a sliding rubber disc controlling the flow of liquid through said inlet means; outlet means from said reciprocating piston being located partly in said valve housing and partly in said reservoir and leading into a chamber means welded inside and to the base of said reservoir; a spring loaded ball valve controlling the flow of liquid through said outlet means; said chamber means completely enclosing the upper portion of said ball valve; an outlet tube attached to said chamber means and leading to the exterior of said reservoir; an adjustable pressure release valve attached to said chamber means for dumping excess liquid within said chamber means back into the reservoir; a chain drive sprocket secured to said crankshaft; a clutch shaft supported from said frame; a freewheeling clutch member associated with said clutch shaft; a first sprocket being attached to said freewheeling clutch member; a sliding clutch member moving on said clutch shaft; a coil spring for forcing apart said sliding clutch member and said freewheeling clutch member disengaged; a second sprocket, this second sprocket being secured to said clutch shaft; a woodruff key upon said clutch shaft for guiding said sliding clutch member during back and forth movement of said sliding clutch member upon said clutch shaft; a third sprocket, this third sprocket being secured to the rear axle; a first chain means trained over said chain drive sprocket and said freewheeling clutch member; a second chain means trained over said second and third sprockets; and a manually controlled clutch operating lever connected by means of linkage means to a tapered clutch actuating fork for forcing said sliding clutch member into engagement with said freewheeling clutch member after overcoming the pressure exerted by said coil spring; whereby the motion transmitted by said power unit to said crankshaft is transmitted to said rear axle so as to propel the sprayer via said first chain means trained over said chain drive sprocket and said freewheeling clutch member, and via said second chain means trained over said second and third sprockets upon movement of said sliding clutch member into engagement with said freewheeling clutch member upon movement of said clutch operating lever by an operator.

2. A power propelled reciprocating piston pump liquid sprayer as recited in claim 1 wherein said power unit is bolted to the reservoir via a base plate with rubber insulators being positioned between said base plate and the reservoir, and further including a protective cover over the first and second pulleys and said "V" belt.

3. A sprayer as defined in claim 2 wherein said crankshaft is supported by sleeve type bushings that are bolted to the reservoir via a reinforcement plate, a first connecting rod is secured to said crankshaft, a second connecting rod is connected to said first connecting rod and to a pivot pin, said connecting rods being hollow so as to facilitate lubrication of the pivot pin and the sleeve type bushings, said second connecting rod having a threaded opening for accommodating a lubrication nipple for supplying a lubricant to the interior of said connecting rods, and means for connecting the pump piston to said pivot pin so that upon rotation of said crankshaft said pump piston is reciprocated within a hollow cylinder.

4. A sprayer as defined in claim 1 wherein the pump piston comprises a hollow sleeve at one end of which there is a rubber piston, said rubber piston having a diameter larger than that of said hollow sleeve, said rubber piston being retained in said hollow sleeve by a rod passing through the center of said rubber piston and being held at a first end by a washer and a retaining nut against the face of the said rubber piston, the opposing end of said retaining rod protruding through said hollow sleeve and the center of an internally fixed boss, sandwiched between said rubber piston and said fixed boss surrounding said retaining rod is a tension spring, said retaining rod having a screw driver slot and a locking nut on the outer end of said internally fixed boss, said hollow sleeve including small lubricant outlet ports, said hollow sleeve being pre-packed with suitable lubricant, said hollow sleeve having a threaded plug on the outer end preventing lubricant from escaping and dirt from entering said hollow sleeve while allowing access to said retaining rod slotted end and said lock nut for adjustment.

5. A sprayer as defined in claim 1 wherein the cylinder of the pump is supported by a brace on one end, said support brace being welded to the base of the reservoir, and at the opposing end said cylinder being welded to the lower portion of said valve housing, said lower portion of said valve housing being bolted to an upper portion of said valve housing, said upper portion of said valve housing being welded to the base of said reservoir, said pump cylinder having a lubrication tube to allow lubrication of the internal walls of said cylinder.

6. A sprayer as defined in claim 5 wherein said inlet valve means comprises a threaded boss, said boss being welded around a hole in the base of said reservoir, an inlet valve body being threaded into said boss from inside said reservoir, said inlet valve body partly protruding into said valve housing, said valve body having several small ports drilled in its base through which liquid can pass from inside of said reservoir into said valve housing on the induction stroke of the pump piston, said ports being blocked off on the inward (exhaust) stroke by said sliding rubber disc, said sliding rubber disc having a guide pin passing through the center thereof and upon which said rubber disc slides, said guide pin being secured to the center of the base of said inlet valve body, said outlet valve means having a threaded boss welded around a hole in the bottom of said reservoir, an outlet valve body being threaded into said boss, said spring loaded ball housed within said outlet valve body, an upper portion of said outlet valve means being enclosed by said chamber means which is welded to the bottom of said reservoir and on the interior of said reservoir.

7. A sprayer as defined in claim 1 wherein said chamber means is made of heavy guage steel and is of such a size so that it can be filled with liquid with a few strokes of the pump piston, a first tube is connected to a lower portion of said chamber means, said first tube leads to the exterior of said reservoir, means on the portion of said tube outside the reservoir for attaching a flexible hose with a spray nozzle, said tube having a faucet to cut off the flow of liquid from said chamber means if desired, a second tube is connected to an upper portion of said chamber means, said second tube leads to said reservoir, said adjustable pressure release valve is connected to said second tube and comprises a ball and a spring, said second tube and valve being situated higher than the top of said chamber means, said valve having provisions to manually regulate said spring pressure, said second tube has a faucet situated upstream of said valve, said faucet when opened allows all of the fluid within the chamber means to run freely back into the reservoir minimizing the fluid pressure of the system.

8. A sprayer as defined in claim 1 wherein the power transmitted from the power unit via said "V" belt to the reciprocating piston pump is reduced in the ratio of 6:1, said chain drive sprocket has 15 teeth and said first sprocket has 49 teeth whereby the speed reduction between said chain drive sprocket and said first sprocket is in the ratio of 3.26:1, said second sprocket has 15 teeth and said third sprocket has 37 teeth resulting in a speed reduction in the ratio of 2.46:1, and wherein the power being transmitted via said third sprocket and rear axle to the rear wheels results in the overall reduction in speed in the ratio of 11.72:1.

9. A sprayer as defined in claim 1 wherein said freewheeling clutch member is hollow and has a large diameter portion and a small diameter portion, said large diameter portion accommodating said coil spring, said small diameter portion being lined with a bronze bushing, said freewheeling clutch member having a cut away section of 180° and approximately $\frac{1}{2}''$ deep angled so as to enable easy engagement and disengagement with said sliding clutch member, said freewheeling clutch member rotating on said clutch shaft which passes through the center of said bronze bushing, said freewheeling clutch member being prevented from sliding back and forth on said clutch shaft by said coil spring acting between said freewheeling clutch member and said sliding clutch member and by a retaining boss on the outer side of said freewheeling clutch member secured to said clutch shaft, said sliding clutch member having a 180° and approximately $\frac{1}{2}''$ deep cut away section angled so as to enable easy engagement and and disengagement with said freewheeling clutch member, said sliding clutch member being hollow, said sliding clutch member having a slot along its inner periphery to accommodate said woodruff key, said woodruff key preventing said sliding clutch member from rotating about said clutch shaft but allowing it to rotate with it, said sliding clutch member has an inner section having a larger diameter than the rest thereof to accommodate said coil spring, said clutch shaft being supported by and rotates in a bushing lined support, retainers with clevis pins prevent said clutch shaft from sliding within said supports, said second sprocket being secured to said clutch shaft by means of a woodruff key and pin, and wherein said clutch actuating fork acts between said second sprocket and said sliding clutch member.

10. A sprayer as defined in claim 9 wherein said actuating lever is pivoted on a fulcrum fixed to said steering handle, said clutch actuating lever when manually depressed causes a clutch control rod to be drawn forward, movement of said clutch control rod causing a pivot pin to move about its axis thus causing said linkage means and consequently said clutch actuating fork to move forward against the pressure of a spring, said linkage means comprising a first rod connected to said pivot pin, a link connected to said first rod, a second rod connected to said link, a cross shaft connected to said second rod, and said spring, said cross shaft slides on a guide pin that is rigidly secured to a further cross member of said frame, the tapered surfaces of said clutch actuating fork pressing against the second sprocket and the sliding clutch member upon movement of actuating lever to cause the engagement of the freewheeling and sliding clutch member, and wherein said spring moves the tapered clutch fork as the linkage means moves to its original position upon release of said actuating lever.

11. A sprayer as defined in claim 1 wherein said rear axle has shafts supported in bushing lined supports, said supports being bolted to said rear cross member, said rear cross member being attached to the frame by a strut on either side, spacers being situated between said axle shaft supports and said rear wheels for preventing said axle shafts and said rear wheels from moving sideways in said support bushings, said third drive sprocket being bolted between the axle shafts transmitting the power through said axle shafts to said rear wheels.

12. A sprayer as defined in claim 1 wherein the front axle is pivoted to the frame by a pivot pin located near the center of said front cross member, and wherein said steering handle is bolted to said front axle on either side close to the front wheels, whereby with any movement of said handle by the operator in either direction will cause said front axle with the attached front wheels to move in the same direction about said pivot pin thus steering the sprayer in that direction.

* * * * *